United States Patent
Beri et al.

(10) Patent No.: US 11,398,065 B2
(45) Date of Patent: Jul. 26, 2022

(54) GRAPHIC OBJECT MODIFICATIONS

(71) Applicant: Adobe Inc., San Jose, CA (US)

(72) Inventors: Tarun Beri, Noida (IN); Gaurav Jain, Noida (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 17/143,381

(22) Filed: Jan. 7, 2021

(65) Prior Publication Data

US 2021/0134037 A1 May 6, 2021

Related U.S. Application Data

(63) Continuation of application No. 16/417,356, filed on May 20, 2019, now Pat. No. 10,930,040.

(51) Int. Cl.
| | |
|---|---|
| *G06T 11/60* | (2006.01) |
| *G06T 11/40* | (2006.01) |
| *G06T 11/20* | (2006.01) |
| *G06T 11/00* | (2006.01) |
| *G06T 1/60* | (2006.01) |
| *G06T 3/40* | (2006.01) |

(Continued)

(52) U.S. Cl.
CPC ............... *G06T 11/60* (2013.01); *G06T 1/60* (2013.01); *G06T 11/001* (2013.01); *G06T 11/203* (2013.01); *G06T 11/40* (2013.01); *G06T 3/20* (2013.01); *G06T 3/40* (2013.01); *G06T 3/60* (2013.01); *G06T 2210/62* (2013.01)

(58) Field of Classification Search
CPC ......... G06T 11/60; G06T 1/60; G06T 11/001; G06T 11/203; G06T 11/40; G06T 3/20; G06T 3/40; G06T 3/60; G06T 2210/62
See application file for complete search history.

(56) References Cited

U.S. PATENT DOCUMENTS

| | | | |
|---|---|---|---|
| 5,293,471 A | 3/1994 | Ikeuchi et al. | |
| 5,355,451 A | 10/1994 | Nonaka | |

(Continued)

OTHER PUBLICATIONS

"First Action Interview Office Action", U.S. Appl. No. 16/417,35, dated Sep. 21, 2020, 3 pages.

(Continued)

*Primary Examiner* — Phong X Nguyen
(74) *Attorney, Agent, or Firm* — FIG. 1 Patents

(57) ABSTRACT

Transformation of graphic objects is described. A graphic object modification system receives an indication of a transformation to be performed on one or more graphic objects. For merger transformations, a stroke and a fill are identified for each graphic object being merged. Fill values are written to a buffer in a first pass, and stroke values are written to the buffer in a second pass without overwriting fill values. The merged graphic object is then output by rendering values stored in the buffer. For other non-merger transformations, z-order information is identified for each displayed graphic object. Graphic objects selected for transformation are allocated into clusters based on their z-order information. Clusters are rendered in separate GPU textures and transformations are applied to the separate textures, enabling the graphic object modification system to output transformation results in real-time without re-rendering the actual graphic objects being transformed.

20 Claims, 8 Drawing Sheets

(51) Int. Cl.
*G06T 3/60* (2006.01)
*G06T 3/20* (2006.01)

(56) References Cited

U.S. PATENT DOCUMENTS

| | | | |
|---|---|---|---|
| 5,872,574 A | 2/1999 | Hara et al. | |
| 5,940,090 A * | 8/1999 | Wilde | G06F 12/0875 |
| | | | 345/557 |
| 6,020,895 A * | 2/2000 | Azami | G06F 3/0481 |
| | | | 345/619 |
| 6,362,818 B1 | 3/2002 | Gardiner et al. | |
| 6,466,229 B1 | 10/2002 | Nagao | |
| 7,505,048 B2 | 3/2009 | Su | |
| 7,730,043 B1 * | 6/2010 | Bourdev | G06T 11/60 |
| | | | 707/803 |
| 8,203,747 B2 | 6/2012 | Owen | |
| 8,208,169 B2 | 6/2012 | Clark et al. | |
| 8,471,855 B2 | 6/2013 | Higuchi et al. | |
| 8,508,550 B1 * | 8/2013 | Jenny | G06T 15/503 |
| | | | 345/620 |
| 8,648,861 B2 | 2/2014 | Hill et al. | |
| 10,043,233 B1 * | 8/2018 | Ben | G06T 11/203 |
| 10,096,122 B1 * | 10/2018 | Agrawal | G06T 7/90 |
| 10,198,674 B2 | 2/2019 | Koziarz et al. | |
| 10,216,356 B2 * | 2/2019 | Noda | G06F 3/017 |
| 10,930,040 B2 | 2/2021 | Beri et al. | |
| 11,244,486 B2 * | 2/2022 | Agrawal | G06T 11/60 |
| 2008/0094395 A1 * | 4/2008 | Woo | G06T 15/405 |
| | | | 345/422 |
| 2008/0288860 A1 * | 11/2008 | Daviss | G06T 11/60 |
| | | | 715/243 |
| 2010/0315431 A1 | 12/2010 | Smith et al. | |
| 2011/0181521 A1 * | 7/2011 | Reid | G06F 3/0483 |
| | | | 345/173 |
| 2012/0062585 A1 | 3/2012 | Torii et al. | |
| 2013/0104037 A1 | 4/2013 | Doan et al. | |
| 2013/0286044 A1 * | 10/2013 | Puckett | G06T 11/00 |
| | | | 345/619 |
| 2014/0152700 A1 * | 6/2014 | Koziarz | G06F 3/1288 |
| | | | 345/636 |
| 2015/0022553 A1 * | 1/2015 | Bono | G06T 11/60 |
| | | | 345/634 |
| 2020/0372695 A1 | 11/2020 | Beri et al. | |

OTHER PUBLICATIONS

"Notice of Allowance", U.S. Appl. No. 16/417,356, dated Oct. 21, 2020, 8 pages.

"Pre-Interview First Office Action", U.S. Appl. No. 16/417,356, dated Aug. 5, 2020, 3 pages.

"Restriction Requirement", U.S. Appl. No. 16/417,356, dated Jun. 5, 2020, 6 pages.

* cited by examiner

GRAPHIC OBJECT MODIFICATIONS

RELATED APPLICATIONS

This application is a continuation of and claims priority to U.S. patent application Ser. No. 16/417,356, filed May 20, 2019, entitled "Graphic Object Modifications", the entire disclosure of which is hereby incorporated by reference.

BACKGROUND

With advances in computing technology, computing devices are an increasingly preferred mechanism for creating artwork, designs, and other displays of digital content that include graphic objects. In contrast to traditional approaches of manually creating such displays (i.e., using pencil and paper), computing devices enable digital content creators to fine-tune the appearance of digital content by modifying visual appearances of individual pieces of digital content included in the display, without having to start over from scratch. As such, graphic object modification is a primary function in many graphic processing applications. As computing devices with increased processing power and other computational resources have developed, so too have the complexity of graphic objects and the number of graphic objects included in a given digital content display. Moreover, these advances in computing technology have led to an increase in user expectations, as users now expect operations to be performed instantaneously in real-time.

Modifying numerous and complex graphic objects to create a digital content display thus presents a difficulty for computing devices with limited processing power, data storage, and other computational resources. One such difficulty is the amount of time required to process modifications involved with editing graphic objects. For instance, conventional vector graphics engines are unable to perform even basic graphic object transformations in real-time. In addition to consuming a large amount of the computing device's computational resources, the performance lag of these conventional approaches results in an unsatisfactory user experience that exponentially increases when a large number of graphic objects are selected and simultaneously transformed. Other conventional graphic object modification approaches, such as graphic object merging, similarly suffer from expensive computational resource costs and lag times that become increasingly evident as more graphic objects are merged with one another.

Thus, conventional approaches for modifying graphic objects are unable to render modifications in real-time, are unable to scale to accommodate large numbers of graphic objects, and consume excessive amounts of network and computational resources.

SUMMARY

Modification of graphic objects in a digital medium environment is described. A graphic object modification system receives a display of multiple graphic objects, an indication of one or more of the multiple graphic objects that are to be modified, and an indication of the modification to be performed. To render results of the modification in real time as the modification is performed, the graphic object modification system mitigates amounts of data storage and other computational resources required to perform the modifications.

For merger modifications that generate a merged graphic object from two or more graphic objects, a stroke and a fill are identified for each of the two or more graphic objects. The graphic object modification system writes fill values for the two or more graphic objects to a buffer in a first pass, then writes stroke values to the buffer in a second pass, preventing stroke values from overwriting fill values already present in the buffer. The merged graphic object can then be output by rendering the values of the buffer.

For other modifications that do not merge stroke or fill values of different graphic objects, the graphic object modification system identifies z-order positioning information for each of the displayed graphic objects. Graphic objects selected for modification are then allocated into respective clusters based on their z-order information, such that each cluster includes only graphic objects having contiguous z-order values. Each cluster is rendered in a separate texture, and modifications are applied to the alternate representations of graphic objects as represented by the separate textures. By rendering the alternate representations as they undergo modifications rather than re-drawing the graphic objects themselves at each stage of the modification, the graphic object modification system outputs results of a modification in real-time while minimizing computational resources required to do so, and replace alternate representations with modified original graphic objects after modification is complete. Thus, the techniques described herein enable modification of one or more graphic objects in a manner that enables real-time display of modification operations in progress while reducing inefficiencies present in conventional digital content modification systems.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
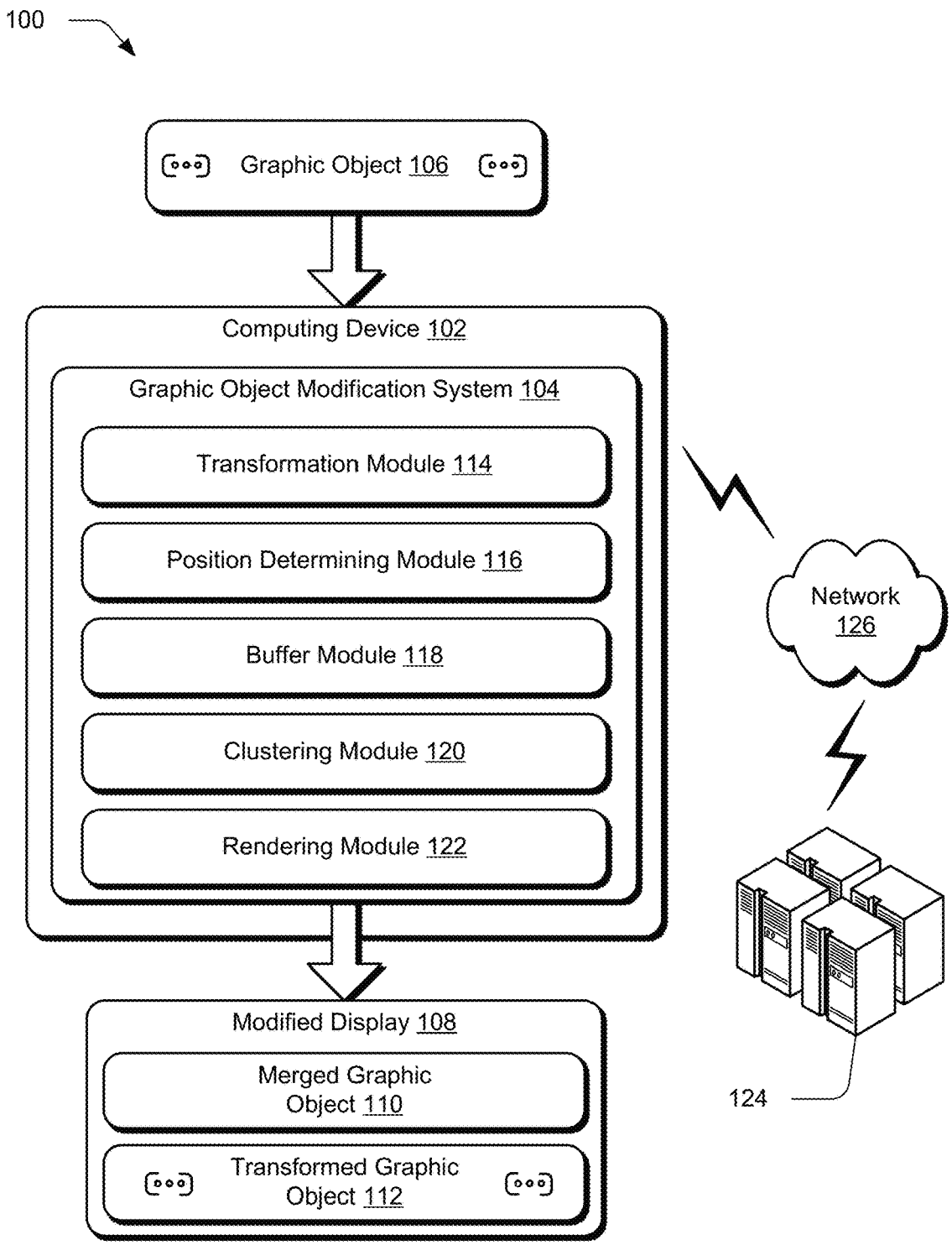
FIG. 1 is an illustration of an environment in an example implementation that is operable to employ the graphic object modification techniques described herein.

As a result of advances in computing technologies, computing systems are increasingly used as a platform for generating and modifying graphic objects, such as vector graphics, Bezier curves, and so forth. As computing devices with increased processing power and other computational resources have developed, so too have the complexity of graphic objects and the number of graphic objects included in a given digital content display. Furthermore, with advances in computing technology, many users now expect graphic object modifications to be performed instantaneously, and for the results of modifications to be displayed in real-time. Although this challenge is present in a wide range of computing device functionality, it presents particular technical difficulty when modifying graphic objects via graphic processing units, particularly when dealing with a large number of graphic objects.

Conventional approaches for performing graphic object modifications often implement sequential algorithms to modify graphic objects. However, these sequential algorithms are unable to scale to accommodate increases in the number of graphic objects being modified and cause readily apparent lag between when a graphic object modification is initiated and when the resulting display is output, resulting in user frustration.

For example, a common modification is a merger of multiple graphic objects, such as a merger of multiple graphic objects defined by one or more Bezier curves. Conventional approaches to merging graphic objects involve mathematical processes where equations of Bezier curves are solved to identify intersection points between the Bezier curves of the shapes being merged. After the intersection points have been identified, conventional approaches generate new Bezier curves either by deleting Bezier curve segments, adding Bezier curve segments, adding one or more faces (or "fills"), and so forth, to merge multiple graphic objects into a merged graphic object. Using conventional approaches, a final set of faces from multiple overlapping graphic objects are joined, and intersecting Bezier curve segments are merged through the addition or deletion of various segments to generate a resultant graphic object. However, this sequential algorithmic approach is unable to scale, and requires additional time and processing resources when dealing with increasing numbers of graphic objects. These deficiencies of conventional approaches are further compounded when attempting to merge an already-merged graphic object with an additional graphic object.

The inability of conventional approaches to render results of modified graphic objects in real-time is also apparent when performing even basic types of graphic object transformations, such as scaling, translating, rotating, shearing, and the like. Some conventional approaches for transforming graphic objects represent individual graphic objects as vector graphics and perform transformations directly on the vector graphics. In these conventional approaches, performance loss is readily evident to the user and delay between input initiating the transformation and output of the corresponding transformation results increases when more graphic objects are displayed together. Other conventional approaches for transforming graphic objects reduce the amount of content otherwise displayed by the graphic object during the transformation through content reduction techniques. Content reduction is implemented by these conventional approaches either by drawing annotations for bounding boxes of graphic objects being transformed or by drawing only strokes without fills for Bezier shapes. However, conventional approaches that implement content reduction techniques are unable to output a true representation of the graphic objects undergoing transformation because, by definition, the reduced content displayed during transformation represents less than a whole of the graphic objects being transformed.

Other approaches attempt to mitigate the lack of information associated with content reduction by implementing content approximation techniques, where vector objects are allowed to pixelate during transformation. However, in addition to pixilation, which provides a distorted representation of the graphic object being transformed, content approximation is unable to provide accurate representations of graphic objects being transformed when those graphic objects overlap, or are overlapped by, other graphic objects. In such an overlapping scenario, content approximation includes a representation of the overlapping graphic object, such that a relic of a non-transformed graphic object is included in the displayed representation of the graphic object being transformed. Thus, conventional approaches are unable to output a true representation of a graphic object in real-time as the graphic object undergoes one or more transformations.

Accordingly, graphic object modification techniques and systems are described. In one example, a graphic object modification system receives multiple graphic objects that are to be merged into a single, merged graphic object. The graphic object modification system identifies a stroke and a fill for each of the multiple graphic objects that are to be merged into the merged graphic object. As described herein, the stroke of a graphic object corresponds to the visible outline of the graphic object. A visual appearance of the stroke may be defined in any suitable manner, such as a line, a curve (e.g., a Bezier curve), combinations thereof, and so forth. The stroke may be defined as having any one or combination of visible display properties, such as having a defined width, having a variable width, being continuous, being a periodic series of dashes and gaps, may have a degree of transparency, may consist of a solid color, may use a gradient of colors, and so forth. The fill of a graphic object corresponds to the visible appearance of the graphic object as bounded by its stroke, and may include any one or combination of visible display properties, such as being a solid color, being a gradient of colors, being a pattern, being a portion of an image or video, having a degree of transparency, and the like. The graphic object modification system implements a position determining module to identify stroke coordinates for the strokes of the multiple graphic objects being merged, as well as fill coordinates for the fills of the multiple graphic objects being merged.

After determining the stroke and fill coordinates from the multiple graphic objects being merged, the graphic object modification system creates a graphic processing unit buffer and initializes the buffer with null (i.e., "zero") values. Initializing the buffer causes the graphic object modification system to interpret the initialized buffer as not including a display of a merged graphic object for rendering. After initializing the buffer, the buffer module writes the fill coordinates to the buffer in a first pass, where pixels that include a display of a fill of one or more of the graphic objects being merged are represented by maximum sentinel values in the buffer. After representing the fill coordinates for the graphic objects being merged as maximum sentinel values in the buffer, the buffer module writes the stroke coordinates to the buffer in a second pass. In contrast to the maximum sentinel values corresponding to graphic object fills, the stroke coordinates are written to the buffer as minimum sentinel values. During the second pass, minimum sentinel values are permitted to overwrite zero values and prohibited from overwriting maximum sentinel values. Thus, the buffer module generates a buffer with information describing a stroke of a merged graphic object that does not intersect a fill of the merged graphic object, without first identifying intersection points of various Bezier curves and generating new Bezier curves through the addition and/or deletion of Bezier curve segments, as performed by conventional approaches. In this manner, the graphic object modification system processes strokes and fills much more efficiently in comparison to conventional approaches by separately analyzing fills of multiple graphic objects in a first pass and strokes of the multiple graphic objects in a second pass. After only two passes, the graphic object modification system generates a buffer that represents the stroke and fill of a merged graphic object, which can be readily read and processed in real-time by a rendering module of the graphic object modification system.

In another example, the graphic object modification system detects that at least one graphic object included in a display of multiple graphic objects is to be transformed via a transformation (e.g., a scale, a translation, a rotation, a shear, a combination thereof, and so forth). In response to detecting such a transformation, the graphic object modification system determines layer ordering information, such as z-order information, for each of the multiple graphic objects included in the display. The layer ordering information may be associated with the multiple graphic objects, or may be determined by the position determining module of the graphic object modification system, along with position information describing a respective position of each of the multiple graphic objects relative to a display device that includes the display of the multiple graphic objects. The graphic object modification system then implements a clustering module to group different ones of the multiple graphic objects into clusters based on their respective layer ordering information. For instance, the clustering module identifies graphic objects that are to be transformed and groups the graphic objects into one or more clusters, where each cluster includes only graphic objects having contiguous layer positions (e.g., contiguous z-order values). Each cluster generated by the clustering module thus does not have a z-order conflict with any other cluster, and individual clusters are rendered by the graphic object modification system in separate graphic processing unit textures, or buffers, along with their included graphic object(s). Each separate texture is then stored by the graphic object modification system as an alternate representation of the one or more objects that the cluster includes.

Transformations can then be executed on these alternate representations, and the rendering module of the graphic object modification system directly outputs the alternate representations of the clusters during the transformations instead of re-rendering individual vector graphic objects during the transformation. Because graphic objects are stored and drawn according to the layer ordering in which they are originally displayed, the output provided by the rendering module provides a true representation of the graphic objects being transformed, in contrast to the limited representations provided by conventional approaches that implement content reduction or content approximation.

After graphic objects have been transformed, the alternate representations are replaced by the vector representations of the corresponding graphic objects.

Thus, the techniques described herein enable modification of one or more graphic objects in a manner that provides a real-time display including true representations of the graphic objects being modified. The real-time display of graphic object modifications is enabled by the described techniques and systems' reduction of computational resources required to process graphic object modifications.

Example Environment

FIG. 1 is an illustration of a digital medium environment 100 in an example implementation that is operable to employ the techniques described herein. The illustrated environment 100 includes a computing device 102, which may be implemented in various configurations. The computing device 102, for instance, may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers to perform operations "over the cloud" as described with respect to FIG. 8.

The computing device 102 is illustrated as including a graphic object modification system 104. The graphic object modification system 104 represents functionality of the computing device 102 to receive at least one graphic object 106 and generate a modified display 108 that includes a modified version of the at least one graphic object 106. The modified display 108 is thus representative of a display resulting from one or more modifications applied to the received at least one graphic object 106, and may include a merged graphic object 110 generated from two or more graphic objects, one or more transformed graphic objects 112 generated from applying a transformation to a graphic object, combinations thereof, and so forth.

As described herein, the graphic object 106 is representative of an image, a portion of a video, text, a vector object, a shape defined by one or more Bezier curves, combinations thereof, and so forth. In some implementations, the graphic object 106 is extracted from an asset that contains other types of media, such as a web page containing images, text, and videos. The graphic object 106 can be obtained by the computing device in any suitable manner. For example, the graphic object may be obtained by from a different computing device, from storage local to the computing device 102, and so forth.

To generate the modified display 108 that includes at least one of a merged graphic object 110 or a transformed graphic object 112, the graphic object modification system 104 employs a transformation module 114, a position determining module 116, a buffer module 118, a clustering module 120, and a rendering module 122. The transformation module 114, the position determining module 116, the buffer module 118, the clustering module 120, and the rendering module 122 are each implemented at least partially in hardware of the computing device 102 (e.g., through use of a processing system and computer-readable storage media), as described in further detail below with respect to FIG. 8.

The transformation module 114 receives input specifying one or more transformations to be applied to the at least one graphic object 106 and performs the one or more transformations on the at least one graphic object 106. As described herein, example modifications performable by the transformation module 114 include a merger of multiple graphic objects 106, a scale of the at least one graphic object 106, a translation of the at least one graphic object 106, a rotation of the at least one graphic object 106, a shear of the at least one graphic object 106, and so forth. Upon identifying a modification to the at least one graphic object 106, the position determining module 116 determines a position of the at least one graphic object 106 to be modified. In some implementations, the position determining module 116 further determines a position of one or more additional graphic objects that are not themselves being modified by the transformation module 114. In this manner, the position determining module 116 is configured to identify a display position and display characteristics of any number of graphic objects being displayed by the computing device 102.

After identifying a modification to be applied to the at least one graphic object 106 and determining a position of graphic objects relative to a display of the computing device 102, the graphic object modification system 104 generates a modified display 108 that includes the modified version of the graphic object 106. The manner in which the graphic object modification system 104 performs a modification is dependent on a type of modification to be performed.

For instance, when the transformation module 114 determines that two or more of the graphic objects 106 are to be merged, the position determining module 116 provides information to the buffer module 118 for the two or more graphic objects 106 that are to be merged. Upon receiving the information from the position determining module 116, the buffer module 118 updates a graphic processing unit (GPU) buffer with information describing locations of fills and strokes of the two or more graphic objects 106 being merged.

As described in further detail below with respect to FIGS. 2 and 3, the buffer module 118 first updates the GPU buffer to include null values representing areas of the computing device 102's display not occupied by the graphic objects 106 being merged. The buffer module 118 then updates the GPU buffer to include maximum sentinel values representing areas of the computing device 102's display occupied by a fill of the graphic objects 106 being merged. Finally, the buffer module 118 updates the GPU buffer to include minimum sentinel values representing areas of the computing device 102's display occupied by a stroke of the graphic objects 106 being merged. In doing so, the buffer module 118 prevents minimum sentinel values representing a stroke from overwriting maximum sentinel values representing a fill. In this manner, the buffer module 118 is configured to output a GPU buffer that includes information specifying an exterior outline for the merged graphic object that does not intersect the fill of the graphic objects 106 from which the merged graphic object 110 was generated. The buffer module 118 then communicates the GPU buffer to the rendering module 122. Upon receipt of the GPU buffer, the rendering module 122 is configured to generate the merged graphic object 110 and output the modified display 108 that includes the merged graphic object 110.

When the transformation module 114 determines that one or more of the graphic objects 106 are to be modified in a manner that preserves the stroke and fill of each of the graphic objects (i.e., not merged with another graphic object), the position determining module 116 provides information to the clustering module 120 for the graphic object(s) 106 to be transformed. In some implementations, and as described in further detail below with respect to FIGS. 4 and 5, the position determining module 116 provides information to the clustering module 120 describing a position of other graphic objects not being modified or transformed. In particular, the position determining module 116 provides the clustering module with z-order information or other information useable to define an ordering of overlapping graphic objects 106. In this manner, the clustering module 120 is provided with information that describes which graphic object should be rendered on top when two or more of the graphic objects 106 are displayed as overlapping one another. Using this z-order information, the clustering module 120 generates at least one cluster that includes graphic objects having contiguous z-order, such that none of the clusters generated by the clustering module 120 have a z-order conflict with one another. The rendering module 122 then rasterizes each cluster in a separate GPU texture, which are stored as separate representations of the graphic objects included in the respective cluster. The transformation module 114 then applies the transformation to the appropriate cluster rasters and the rendering module 122 uses the alternative representations of the cluster rasters to output a display of the transformed graphic object(s) 112 in real-time as the transformation is being applied. Because each of the clusters were generated by the clustering module 120 with respect to the graphic objects' 106 z-order, the transformed graphic object 112 provides a true representation of the transformation being applied. Upon completion of the transformation, the rendering module 122 switches the transformed graphic object 112 back to its original rendering format (e.g., vector graphic format, Bezier curve, etc.) and outputs the original rendering format, having the transformation applied, as part of the modified display 108.

The modified display 108 may be stored in storage of the computing device 102, as described in further detail below with respect to FIG. 8. Alternatively or additionally, the graphic object modification system 104 is configured to provide the modified display 108 to a service provider for subsequent retrieval and/or access by the computing device 102 or different computing devices. For instance, the graphic object modification system 104 may communicate the modified display 108 to service provider 124, or directly to a different computing device, via network 126.

Having considered an example digital medium environment, consider now a discussion of an example system usable to generate a modified display of one or more graphic objects in accordance with aspects of the disclosure herein.

Figure 2:
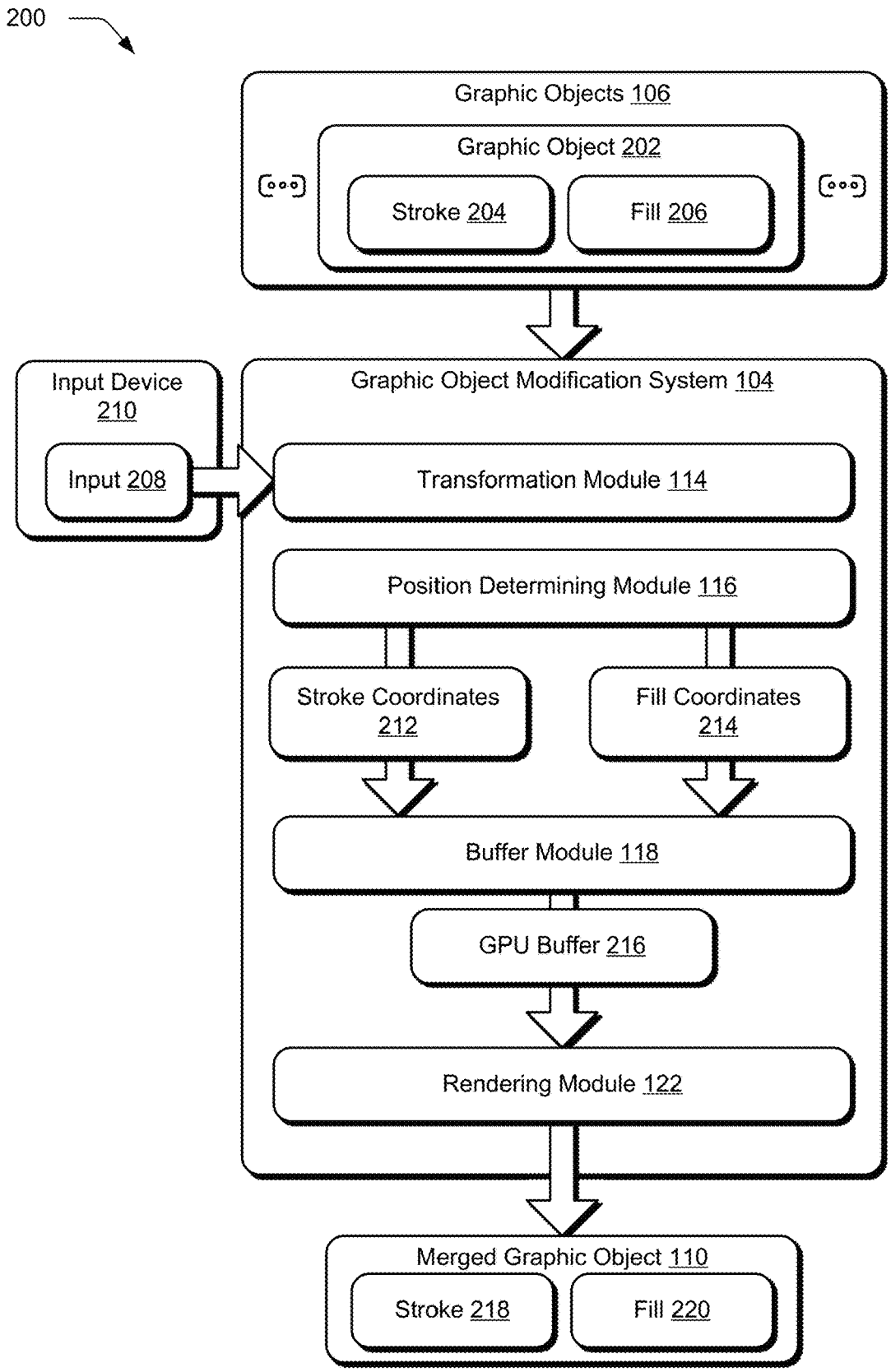
FIG. 2 illustrates an example implementation in which a graphic object modification system of FIG. 1 generates a modified display of a graphic object using techniques described herein.

FIG. 2 illustrates an example system 200 useable to generate a merged graphic object 110 from multiple graphic objects 106 in accordance with the techniques described herein. In the illustrated example, system 200 includes modules of the graphic object modification system 104 as described with respect to FIG. 1, e.g., transformation module 114, position determining module 116, buffer module 118, and rendering module 122. System 200 may be implemented on any suitable device or combination of devices. In one example, system 200 is implemented on one computing device (e.g., computing device 102 of FIG. 1). In another example, system 200 is implemented on more than one computing device, as described in further detail below with respect to FIG. 8.

In the example system 200, the graphic object modification system 104 receives multiple graphic objects 106, individual ones of which are represented by the graphic object 202. Graphic object 202 is illustrated as having a stroke 204 and a fill 206. As described herein, the stroke 204 of graphic object 202 corresponds to the visible outline of the graphic object 202. A visual appearance of the stroke 204 may be defined in any suitable manner, such as a line, a curve (e.g., a Bezier curve), combinations thereof, and so forth. The stroke 204 may be defined as having any one or combination of visible display properties, such as having a defined width, having a variable width, being continuous, being a periodic series of dashes and gaps, may have a degree of transparency, may consist of a solid color, may use a gradient of colors, and so forth. As described herein, the fill 206 of graphic object 202 corresponds to the visible appearance of the graphic object 202 as enclosed by the stroke 204. The fill 206 may have any one or combination of visible display properties, such as being a solid color, being a gradient of colors, being a pattern, being a portion of an image or video, having a degree of transparency, and the like.

Upon receiving the multiple graphic objects 106, the transformation module 114 detects a merger operation of two or more of the graphic objects 202. In some implementations, the merger operation is detected in response to receiving input at the computing device implementing the transformation module 114. For instance, input specifying a merger of at least two graphic objects 202 is represented by input 208, which may be received from an input device 210 of a computing device implementing the graphic object modification system 104, such as computing device 102 of FIG. 1. The input device 210 may be configured in any suitable manner, and is representative of an input device of the computing device 102, as described in further detail below with respect to FIG. 8.

Upon receiving input 208, the transformation module communicates an indication of the two or more graphic objects 202 that are to be merged to generate the merged graphic object 110. The position determining module 116 then analyzes the two or more graphic objects 202 to determine stroke coordinates 212 for the strokes 204 of the two or more graphic objects 202 being merged. Additionally, the position determining module 116 analyzes the two or more graphic objects 202 to determine fill coordinates 214 for the fills 206 of the two or more graphic objects 202 being merged. In this manner, the position determining module 116 is configured to provide the graphic object modification system 104 with information describing a specific location of the strokes 204 and fills 206 of graphic objects 202 being merged relative to a display device at which the graphic objects 202 being merged are displayed. In this manner, the stroke coordinates 212 and fill coordinates 214 may specify the display locations of the graphic objects 202 being merged in any suitable manner, such as through pixel locations, through Cartesian coordinates, and so forth. The position determining module 116 then provides the stroke coordinates 212 and the fill coordinates 214 to the buffer module 118. In this manner, the buffer module 118 is provided with information describing stroke locations and fill locations of the two or more graphic objects 202 being merged. By separating the strokes 204 and fills 206 into separate stroke coordinates 212 and fill coordinates 214, the graphic object modification system 104 enables the buffer module to process the multiple graphic objects 202's fills and strokes independent of one another.

The buffer module 118 creates a GPU buffer 216 to record the state (e.g., fill or stroke) of every pixel rendered by the multiple graphic objects 202 being merged. In some implementations, the GPU buffer 216 is representative of a single-channel (8-bit) graphic processing unit texture created to segregate fill and stroke of graphic objects 202 to be merged. To do so, the buffer module 118 updates values of the GPU buffer 216 in two passes: through a first pass considering only the fills 206 of the multiple graphic objects 202, and in a second pass considering only the strokes 204 of the multiple graphic objects 202. In some implementations, prior to the first pass, the buffer module 118 may initialize the GPU buffer 216 to include only null values (e.g., "0"), which are representative of areas of the display device that do not include a display of one or more of the graphic objects 106. In performing the two passes, the buffer module 118 is configured to overwrite the null values with values indicating one or more of the strokes 204 or fills 206 of the graphic objects 202 being merged are displayed in the corresponding location of the display device.

In the first pass, where only the fills 206 of the graphic objects 202 are considered, the buffer module 118 assigns a maximum sentinel value (e.g., "2") to locations (e.g., pixels) of the GPU buffer 216 corresponding to the fill coordinates 214. In this manner, after the first pass, the GPU buffer 216 includes information specifying where fills 206 of the two or more graphic objects 202 being merged appear relative to a display device outputting a display of the graphic objects 106. In the second pass, the buffer module 118 considers only the strokes 204 of the graphic objects 202 being merged, and assigns a minimum sentinel value (e.g., "1") to locations of the GPU buffer 216 corresponding to the stroke coordinates 212. Although the minimum sentinel values are permitted to overwrite null values in the GPU buffer 216, minimum sentinel values are prohibited from overwriting maximum sentinel values in the GPU buffer 216, which correspond to the fill coordinates 214 of the two or more graphic objects 202 being merged.

In some implementations, the maximum sentinel values are representative of a single fill style of one of the graphic objects 202, as represented by fill 206, which is applied to the entirety of the fill 220 of the merged graphic object 110. The fill style applied to the fill 220 of the merged graphic object 110 may be selected from any one of the graphic objects 202. In some implementations, the graphic object modification system 104 may display a prompt that lists different fills 206 of the graphic objects 202 being merged. The prompt is selectable via input to the input device 210, thereby enabling a user of the graphic object modification system 104 to select which single fill is to be applied to the merged graphic object 110. Alternatively or additionally, the fill 220 of the merged graphic object 110 may be representative of a combination of multiple fills 206 from multiple different graphic objects 202. In this manner, different styles may be represented by different sentinel values in the GPU buffer. For instance, a fill 206 corresponding to a solid color may be represented by a first maximum sentinel value while a linear gradient fill 206 may be represented by a second maximum sentinel value, where the first and second maximum values are associated with fill style information stored in the GPU buffer. In this manner, the merged graphic object 110 may include a fill 220 comprised of any one or more of the fills 206 of the graphic objects 202 being merged. In a similar manner, the graphic object modification system 104 may generate the stroke 218 of the merged graphic object to include any one or more strokes 204 of the graphic objects 202 being merged.

The exception to the graphic object modification system 104's prevention of stroke coordinates 212 overwriting fill coordinates 214 as represented by their respective sentinel values in the GPU buffer 216 is that the stroke 204 of a graphic object is permitted to overwrite the fill 206 of the same graphic object 202, but not others of the graphic objects 106. By permitting a graphic object's stroke to overwrite its own fill, the graphic object modification system 104 accounts for three varying types of strokes: strokes that lie completely outside the fill of a graphic object; strokes that lie completely inside the fill of a graphic object; and strokes that lie partially inside and partially outside the graphic object. Thus, by permitting a graphic object 202's stroke 204 to overwrite its own fill 206, the buffer module 118 preserves stroke values for all three types of strokes. In this manner, the stroke 218 of the merged graphic object 110 is prevented from visually occluding the fill 220 of the merged graphic object 110, as generated from the strokes 204 and fills 206 of the multiple graphic objects 202. After performing both passes, the buffer module 118 communicates the GPU buffer 216 to the rendering module 122. Upon receipt of the GPU buffer 216, the rendering module 122 outputs the merged graphic object 110, which includes its own stroke 218 and fill 220, as defined by the sentinel values included in the GPU buffer 216.

In this manner, the merged graphic object 110 may readily be merged with one or more additional graphic objects 202. For example, the stroke 218 and the fill 220 of the merged graphic object may be maintained in the GPU buffer 216 by their respective sentinel values, and another graphic object 202 may be processed by the graphic object modification system 104 in a similar manner as described above. Continuing this example, that the fill 206 of the other graphic object 202 is permitted to overwrite sentinel values corresponding to the stroke 218 of the merged graphic object, while the stroke 204 of the other graphic object are prohibited from overwriting sentinel values corresponding to the fill 220 of the merged graphic object in the GPU buffer 216. Thus, the merge transformations performed by the graphic object modification system 104 are readily extendable to multiple levels of a hierarchy when groups of graphic objects 106 are subjected to sequential mergers.

Having considered an example system 200, consider now a discussion of an example merged graphic object 110 generated from multiple graphic objects 106 in accordance with one or more aspects of the disclosure.

Figure 3:
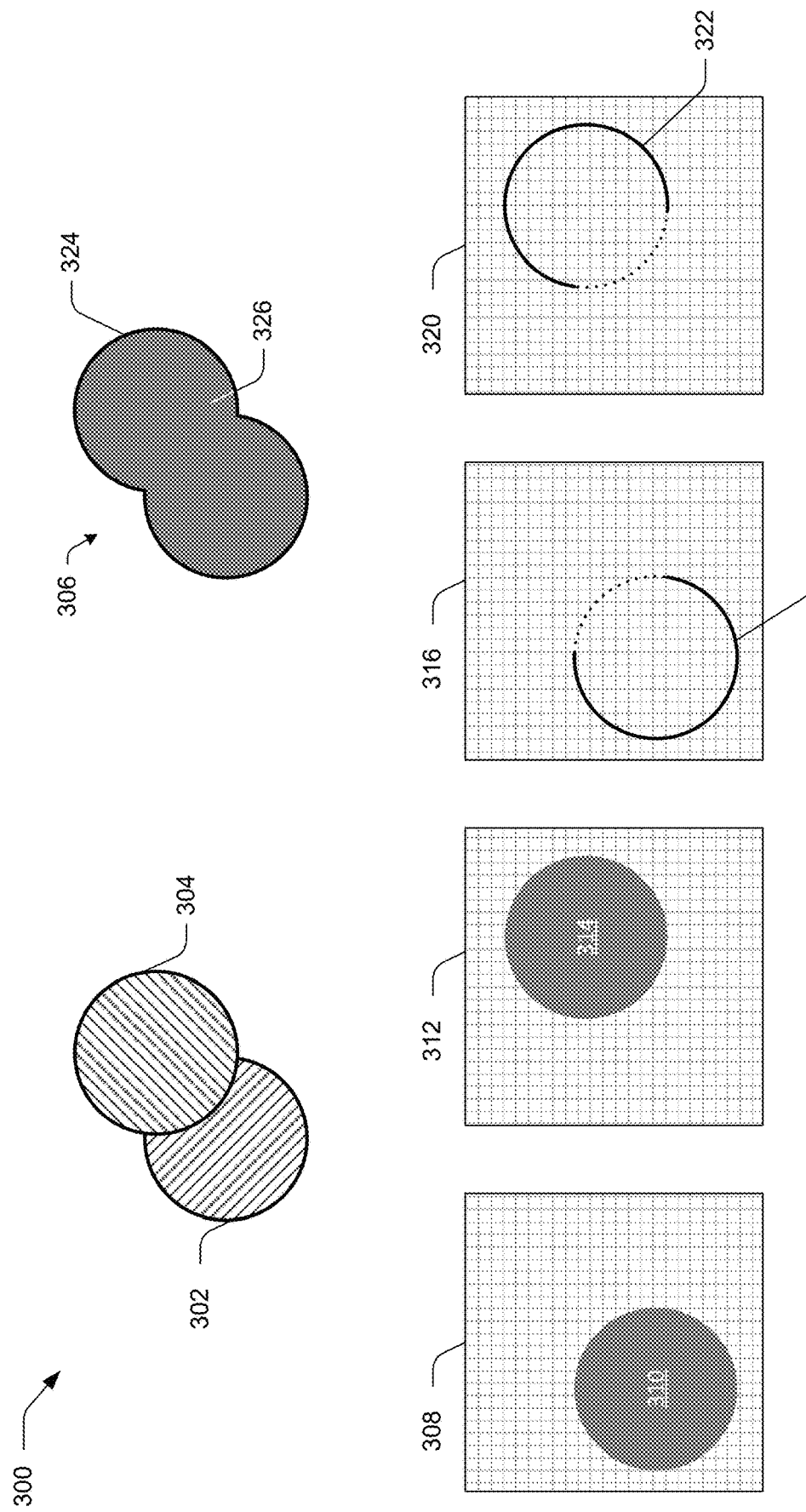
FIG. 3 illustrates the graphic object modification system of FIG. 1 generating a merged graphic object in accordance with one or more implementations.

FIG. 3 illustrates an example implementation 300 of the graphic object modification system 104 generating a merged graphic object from multiple input graphic objects using the techniques described herein. The illustrated example includes a first graphic object 302 and a second graphic object 304, illustrated as partially overlapping the first graphic object 302. Although illustrated as circles, the first and second graphic objects 302, 304 are representative of any suitable type of graphic object, such as the graphic objects 106 described with respect to FIGS. 1 and 2. The merged graphic object 306 generated from a merger of the first and second graphic objects 302 and 304 is representative of the merged graphic object 110, as illustrated and described with respect to FIGS. 1 and 2.

To generate the merged graphic object 106, the graphic object modification system 104 first processes the fills of graphic object 302 and graphic object 304. The position determining module 116, for instance, determines fill coordinates 214 for each of the graphic objects 302 and 304 and communicates the fill coordinates 214 to the buffer module 118. The buffer module 118 then updates the GPU buffer 216 with maximum sentinel values to indicate that a corresponding area of a display device is to be occupied by the fill of a resulting merged graphic object 110, as represented by the merged graphic object 306 of the example implementation 300. The buffer module 118's processing of the first graphic object 302's fill is illustrated at 308, where the first graphic object 302's fill is represented in the GPU buffer 216 at 310. The grid on which the fill 310 is illustrated may be representative of the GPU buffer 216, where each cell of the grid might correspond to a pixel of a display device of computing device implementing the graphic object modification system 104, such as computing device 102 of FIG. 1. Although described herein with respect to an on-screen buffer, the graphic object modification system 104 is configured to perform the same functionality using an off-screen buffer.

The buffer module 118's processing of the second graphic object 304's fill is illustrated at 312, where the second graphic object 304's fill is represented in the GPU buffer 216 at 314. The grid on which the fill 314 is illustrated may be representative of the GPU buffer 216, where each cell of the grid corresponds to a pixel of the display device of the computing device implementing the graphic object modification system 104. In the illustrated example 300, some cells of the GPU buffer 216 are occupied by both fills 310 and 314, which correspond to fill portions of the graphic objects 302 and 304 that overlap one another. Although illustrated separately at 308 and 312 to represent the fill coordinates of both graphic objects 302 and 304, the graphic object modification system 104 is configured to process the fills 310 and 314 simultaneously during the first pass performed by the buffer module 118. In this manner, the buffer module 118 is configured to create a GPU buffer that includes sentinel values describing the fill coordinates of multiple graphic objects being merged, such as the first and second graphic objects 302 and 304.

After performing the first pass and creating the GPU buffer with maximum sentinel values indicating fill coordinates of multiple graphic objects undergoing a merger operation, the graphic object modification system 104 is configured to perform a second pass to update the GPU buffer with minimum sentinel values corresponding to the stroke coordinates of the graphic objects being merged. The position determining module 116, for instance, determines stroke coordinates 212 for each of the first and second graphic objects 302 and 304 and communicates the stroke coordinates 212 to the buffer module 118. The buffer module 118 then updates the GPU buffer 216 with minimum sentinel values at each area of the GPU buffer corresponding to an area of the display device to be occupied by a stroke of a resulting merged graphic object 110, as represented by the merged graphic object 306 of the example implementation 300. To ensure that the stroke of the resulting merged graphic object 110 does not intersect the fill of the merged graphic object 110, the buffer module 118 is prevented from overwriting maximum sentinel values of the GPU buffer indicating a fill of another graphic object included in the merger. In some implementations, the buffer module 118 permits minimum sentinel values to overwrite maximum sentinel values for a same graphic object, in order to account for scenarios where a graphic object's stroke is either partially or completely inside the fill of the same graphic object.

The buffer module 118's processing of the first graphic object 302's stroke is illustrated at 316, where the stroke of the first graphic object 302 is represented in the GPU buffer 216 by the solid portion of the circle 318. The dotted portion of the circle 318 is representative of minimum sentinel values that otherwise would be written to the GPU buffer 216 as indicated by the stroke coordinates 212 for the first graphic object 302, but are prevented from being written to the GPU buffer 216 based on the presence of maximum sentinel values corresponding to the fill 314 of the second graphic object 304. Thus, the buffer module 118 only writes to the GPU buffer 216 minimum sentinel values corresponding to portions of the first graphic object 302's stroke that does not visually occlude, or is otherwise overlapped by, the fill of the second graphic object 304.

The buffer module 118's processing of the second graphic object 304's stroke is illustrated at 320, where the stroke of the second graphic object 304 is represented in the GPU buffer 216 by the solid portion of the circle 322. The dotted portion of the circle 322 is representative of minimum sentinel values that otherwise would be written to the GPU buffer 216 as indicated by the stroke coordinates 212 for the second graphic object 304, but are prevented from being written to the GPU buffer 216 based on the presence of maximum sentinel values corresponding to the fill 310 of the first graphic object 302. Thus, the buffer module 118 only writes to the GPU buffer 216 minimum sentinel values corresponding to portions of the second graphic object 304's stroke that does not visually occlude, or is otherwise overlapped by, the fill of the first graphic object 302. In some implementations, the strokes of the first and second graphic objects 302 are not written to the GPU buffer and the stroke coordinates 212 for the graphic objects being merged is directly communicated to the rendering module 122 with the GPU buffer 216. Because the graphic object modification system 104 prevents strokes from overwriting fills, the rendering module may directly render the strokes of the graphic objects being merged at locations indicated by the stroke coordinates 212, except for locations indicated by the GPU buffer as being occupied by a fill of the resulting merged graphic object.

Although illustrated separately at 316 and 320 to represent the stroke coordinates of both graphic objects 302 and 304, the graphic object modification system 104 is configured to process the strokes 318 and 320 of multiple graphic objects simultaneously during the second pass performed by the buffer module 118. In this manner, the buffer module 118 is configured to create and update a GPU buffer that includes sentinel values describing the strokes of multiple graphic objects being merged, such as the first and second graphic objects 302 and 304, in a manner that does not overlap a fill of the graphic objects being merged.

Taken together, the information in the GPU buffer 216 is useable by the rendering module 122 to output the merged graphic object 306 in real-time as the merge transformation is performed by the transformation module 114. Specifically, in the example implementation 300, the solid portions of the circles 318 and 322 are representative of the resulting stroke 324 for the merged graphic object 306. Similarly, the fills 310 and 314 are representative of a resulting fill 326 of the merged graphic object 306. This real-time rendering is enabled by the techniques described herein, which avoid the time-intensive steps of mathematically solving Bezier curves for intersection and computing a resulting geometry of a merged graphic object, as performed by conventional approaches.

Having considered an example of transforming multiple graphic objects through a merge transformation, consider examples of transforming graphic objects through different transformation operations.

Figure 4:
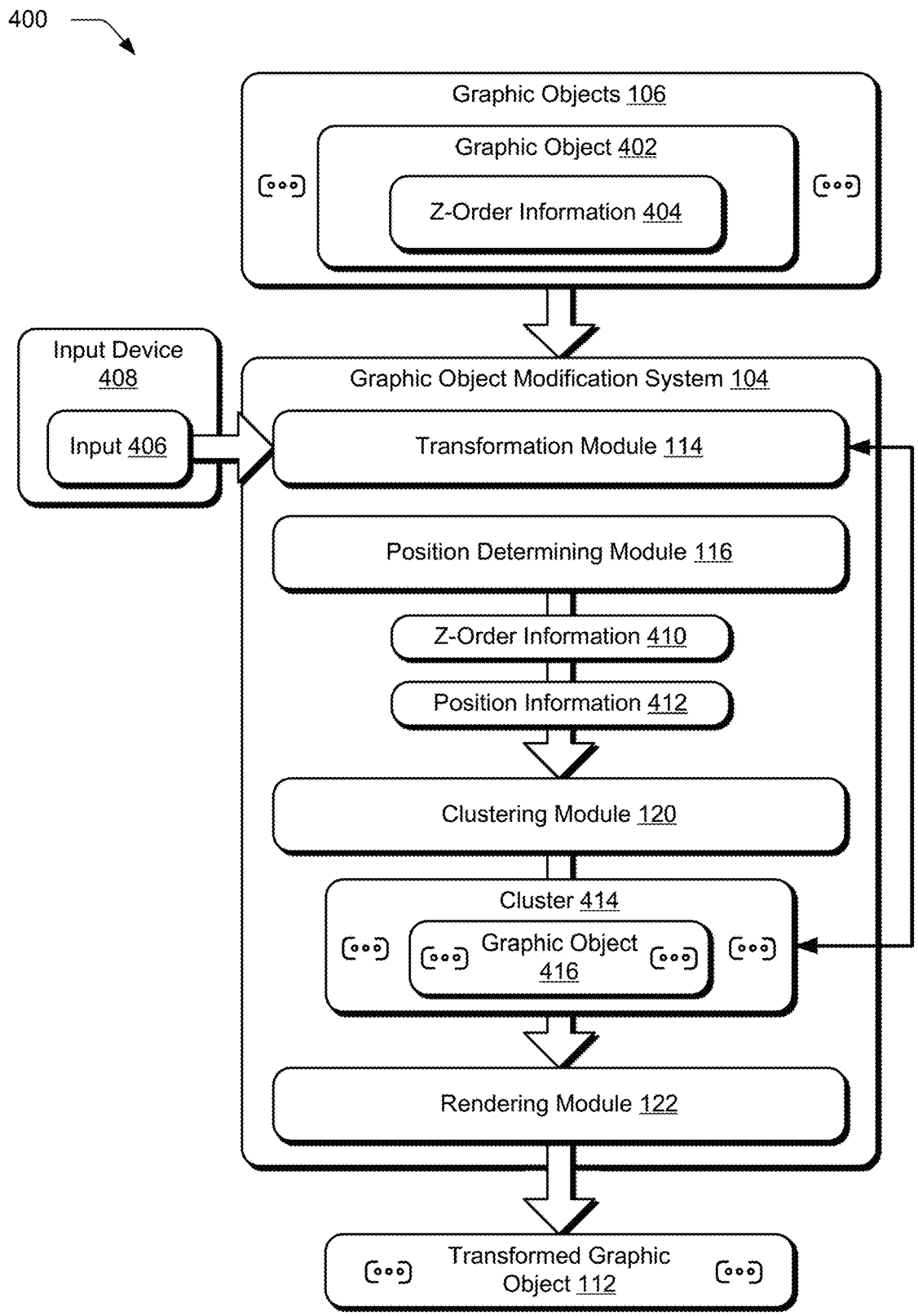
FIG. 4 illustrates an example implementation in which the graphic object modification system of FIG. 1 generates a modified display of a graphic object using techniques described herein.

FIG. 4 illustrates an example system 400 useable to generate a transformed graphic object 112 included in a display of multiple graphic objects 106 in accordance with the techniques described herein. In the illustrated example, system 400 includes modules of the graphic object modification system 104 as described with respect to FIG. 1, e.g., transformation module 114, position determining module 116, clustering module 120, and rendering module 122. System 400 may be implemented on any suitable device or combination of devices. In one example, system 400 is implemented on one computing device (e.g., computing device 102 of FIG. 1). In another example, system 400 is implemented on more than one computing device, as described in further detail below with respect to FIG. 8.

In the example system 400, the graphic object modification system 104 receives multiple graphic objects 106 included in a display with one another, individual ones of which are represented by the graphic object 402. Graphic object 402 is illustrated as having associated z-order information 404, which is representative of information useable by the graphic object modification system 104 to determine an ordering of overlapping ones of the graphic objects 106. For instance, if a portion of a display device is occupied by different ones of the graphic objects 106, a graphic object having a higher z-order will be displayed as visually overlapping another graphic object having a lower z-order at the same portion of the display device. In this manner, the graphic object modification system 104 is provided with information describing a layer ordering of multiple graphic objects 106 being displayed by a computing device implementing the graphic object modification system 104, such as computing device 102.

The transformation module 114 then detects a transformation operation applied to at least graphic object 402 of the multiple graphic objects 106. The transformation operation may be representative of any type of transformation, such as a scaling, a translation, a rotation, a shearing, combinations thereof, and so forth of one or more of the graphic objects 106. In some implementations, the transformation operation is detected in response to receiving input at the computing device implementing the transformation module 114. For instance, input specifying a transformation of one or more graphic objects 402 is represented by input 406, which may be received from an input device 408 of a computing device implementing the graphic object modification system 104, such as computing device 102 of FIG. 1. The input device 408 may be configured in any suitable manner, and is representative of an input device of the computing device 102, as described in further detail below with respect to FIG. 8.

Upon receiving input 406, the transformation module 114 communicates an indication of the multiple graphic objects 106, as individually represented by the graphic object 402 with its corresponding z-order information 404, along with an indication of the one or more graphic objects to which the transformation is to be applied. The position determining module 116 then analyzes the graphic objects 106 to determine z-order information for all the graphic objects 106, as represented by the aggregate z-order information 410. In some implementations where a graphic object 402 is not provided to the graphic object modification system 104 with its corresponding z-order information 404, the position determining module 116 is configured to deduce the z-order information 404 for the graphic object 402 at runtime and include the deduced z-order information in the z-order information 410. Additionally, the position determining module analyzes the graphic objects 106 to determine position information 412 describing display locations for each of the graphic objects 106 relative to a display device at which the graphic objects 105 are displayed. In this manner, the position information 412 may specify the display locations of the graphic objects 106 in any suitable manner, such as via pixel locations, via Cartesian coordinates, and so forth. The position determining module 116 then provides the z-order information 410 and the position information to the clustering module 120. In this manner, the clustering module 120 is provided with information describing an overall display appearance of the graphic objects 106 as output by the graphic object modification system 104, such as a display of the graphic objects 106 as rendered by the rendering module 122 at a display device of a computing device implementing the graphic object modification system 104.

Upon receiving the z-order information 410 and the position information 412, the clustering module is configured to create one or more clusters 414 that include at least one graphic object 402 being transformed by the input 406, as indicated by the at least one graphic object 416 included in the cluster 414. Each cluster 414 generated by the clustering module 120 groups one or more graphic objects 402 based on their associated z-order information 404 such that the one or more graphic objects 416 included in the cluster have contiguous z-order values. In some implementations, each cluster 414 represents a maximum possible grouping of objects displayed in contiguous z-order. Specifically, to generate the one or more clusters 414, the clustering module first sorts the one or more graphic objects 402 selected for transformation in ascending z-order. The clustering module 120 then performs a linear scan over the sorted list and logically groups the graphic objects 402 in a cluster until the clustering module 120 identifies a graphic object with a z-order that is not a contiguous to a z-order of a previous graphic object added to the cluster (i.e., a graphic object with a z-order that is not one plus the z-order of the graphic object previously added to the cluster). Upon detecting such a non-contiguous z-order graphic object subject to a transformation indicated by input 406, the clustering module 120 completes the current cluster 414 and generates a new cluster 414 to which the graphic object having the non-contiguous z-order value is added. The clustering module 120 continues to generate clusters 414 in this manner until all graphic objects 106 have been allocated into one of the clusters, such that none of the multiple clusters 414 include a graphic object that have a contiguous z-order conflict with a graphic object of another cluster.

Each cluster 414 and its included one or more graphic objects 416 are then rendered in a separate GPU texture, or buffer. Although not illustrated in the example system 400, each cluster 414 may be rendered in a separate GPU texture by the buffer module 118 of the graphic object modification system 104. In this manner, the separate GPU textures are stored as alternate representations of the at least one graphic object 416 included in the cluster 414 corresponding to the respective GPU texture. The transformation module 114 is then configured to perform the transformation specified by input 406 directly on the individual cluster 414 as rasterized in the corresponding GPU texture. In this manner, instead of re-processing the actual graphic objects 106, the transformation module 114 directly applies the transformation to the alternate representations of the graphic object as represented in the corresponding GPU texture, thereby enabling the rendering module 122 of the graphic object modification system 104 to render true representations of the graphic object(s) 402 being transformed without reducing an amount of content being rendered at a display device or incidentally rendering portions of a graphic object not undergoing a transformation as being transformed (e.g., without rendering a portion of a different graphic object not undergoing transformation that visually overlaps at least a portion of a graphic object undergoing transformation). In some implementations where a transformation is likely to result in pixilation of the graphic object during transformation (i.e., pixilation resulting from scaling a graphic object), the rendering module 122 is configured to employ bilinear filtering or other image filtering techniques to the corresponding GPU texture to minimize pixilation effects. Upon completion of the transformation, the rendering module 122 is configured to replace the representations of the graphic objects 106 being transformed with their actual transformed renderings (e.g., vector renderings).

In some implementations, the clustering module 120 is configured to generate one or more clusters 414 to include graphic objects 416 that are not subject to the transformation indicated by input 406. For example, a first graphic object 402 may be subject to a translation transformation that moves the first graphic object 402 from a left portion of a display to a right portion of the display, where the first graphic object 402 visually overlaps a second graphic object and a third graphic object during the translation from the left portion to the right portion of the display. Stated differently, the clustering module 120 computes a minimum frame buffer that encompasses updates to a display output by the rendering module 122 as necessitated by a transformation, and may identify one or more other graphic objects 106 that fall within the minimum frame buffer. In such a scenario, other graphic objects falling within the minimum frame buffer will require a re-draw by the rendering module 122, which may consume a significant number of central processing unit and/or graphic processing unit cycles to perform.

Accordingly, in scenarios where non-transformed graphic objects are identified as falling within the minimum frame buffer for a transformation, the clustering module 120 is configured to allocate the non-transformed graphic objects to one or more clusters 414. In this manner, rather than re-drawing graphic objects within the minimum frame buffer not undergoing a transformation, the rendering module 122 can re-draw these graphic objects based on their representations as included in the cluster 414. However, in some scenarios where a large number of graphic objects not undergoing transformation are included within the minimum frame buffer, the time required to generate the corresponding clusters 414 and render the cluster 414's graphic objects in the GPU texture may be substantial. In other events, this clustering of non-transformed graphic objects is unnecessary in the event the transformation does not cause one of the graphic objects 106 undergoing transformation to visually overlap a non-transformed one of the graphic objects 106. To minimize these scenarios, the clustering module 120 deliberately creates small clusters of untransformed graphic objects whenever possible. To do so, the clustering module 120 does not simply group as many ones of the untransformed graphic objects 402 having contiguous z-order information 404 as possible, but rather groups the untransformed graphic objects 402 according to both their z-order information 410 and positon information 412.

In this manner, overlapping untransformed graphic objects are clustered together so long as their z-order is contiguous, while disjoint graphic objects not overlapping other graphic objects are allocated to separate clusters 414, even if the disjoint untransformed graphic objects have contiguous z-order values with other untransformed graphic objects. In some implementations, the position information 412 describes the bounding boxes of all graphic objects 106, which is used by the clustering module 120 to identify and separately cluster disjoint ones of the graphic objects 106. In this manner, the clustering module 120 is configured to perform an on-demand clustering of untransformed graphic objects only in response to detecting that the transformation of one or more other graphic objects 106 visually overlaps an untransformed graphic object. After generation, the corresponding texture for each cluster 414 is cached until the cluster 414's included one or more graphic objects 416 are actually transformed, or until memory usage of the computing device implementing the graphic object modification system 104 exceeds a threshold amount, thereby outputting at least one transformed graphic object 112 in real-time in a manner that adapts to user interactions with the graphic objects 106, such as via input 406.

Having considered an example system 400, consider now a discussion of an example transformed graphic object 112 generated from one or more graphic objects 106 allocated into one or more clusters 414 in accordance with one or more aspects of the disclosure.

Figure 5:
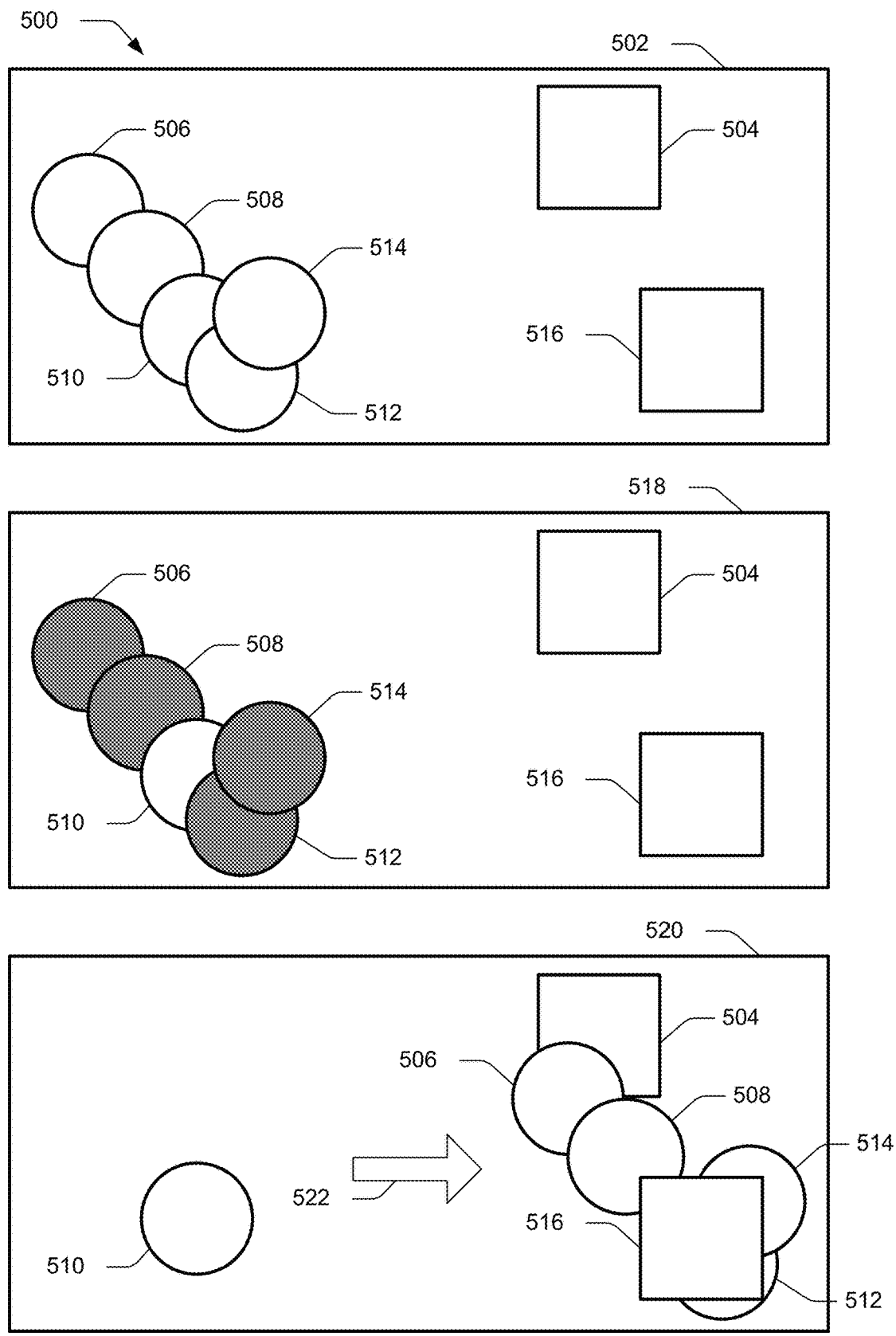
FIG. 5 illustrates the graphic object modifications system of FIG. 1 generating a transformed graphic object in accordance with one or more implementations.

FIG. 5 illustrates an example implementation 500 of the graphic object modification system 104 generating a modified display that includes at least one transformed graphic object using the techniques described herein. The illustrated example includes a display 502 of graphic objects 504, 506, 508, 510, 512, 514, and 516, which are each representative of a graphic object 402, as illustrated and described with respect to FIG. 4. In the illustrated example, the z-order information 404 of the respective graphic objects is illustrated by the overlapping nature of graphic objects 506, 508, 510, 512, and 514. For instance, in the illustrated example graphic object 506 may have a z-order position of one, graphic object 508 may have a z-order position of two, graphic object 510 may have a z-order position of three, graphic object 512 may have a z-order position of four, and graphic object 514 may have a z-order position of five. As illustrated, the z-order information for each graphic object dictates a manner in which the graphic object appears relative to the other graphic objects, where graphic objects having higher z-order positions are displayed as visually overlapping graphic objects having lower z-order positions. In the illustrated example, graphic object 504 may have a z-order position of zero, indicating that graphic object 504 is not to overlap any other graphic object, and graphic object 516 may have a maximum z-order position, indicating that no other graphic object is to overlap graphic object 516. Thus, each of the graphic objects included in display 502 are representative of a graphic object 402 with associated z-order information 404, as illustrated and described with respect to FIG. 4.

Display 518 illustrates an instance of display 502 where graphic objects 506, 508, 512, and 514 are selected for transformation, as indicated by the shading of the selected graphic objects. The graphic objects 506, 508, 512, and 514 may be selected for transformation, for instance, by input 406 via input device 408, as described and illustrated with respect to FIG. 4. In response to the transformation module 114 detecting the selection of graphic objects 506, 508, 512, and 514, the position determining module 116 identifies z-order information 410 and position information 412 for each of the graphic objects 506, 508, 512, and 514. In some implementations, the position determining module 116 additionally identifies z-order information 410 and position information 412 for other graphic objects not selected for transformation, such as for one or more of graphic objects 504, 510, and 516. The position determining module 116 then communicates the z-order information 410 and position information 412 to the clustering module.

Upon receipt of the z-order information 410 and the position information 412, the clustering module 120 clusters the graphic objects 506, 508, 512, and 514 selected for transformation into multiple clusters 414 based on the corresponding z-order information for each of graphic objects 506, 508, 512, and 514. In this manner, the clustering module 120 generates two different clusters 414 for the graphic objects 506, 508, 512, and 514, where graphic objects 506 and 508 are allocated to a first cluster and graphic objects 512 and 514 are allocated to a second cluster. Clustering module 120 allocates graphic objects 506, 508, 512, and 514 to separate clusters 414 due to the lack of contiguous z-order positions between graphic objects 508 and 512. After allocating the graphic objects 506, 508, 512, and 514 undergoing transformation to their respective clusters, each cluster 414 is rendered in a separate GPU texture and stored as an alternate representation of the graphic objects included in the respective cluster. In this instance, representations of graphic objects 506 and 508 would be stored in a first GPU texture and representations of graphic objects 512 and 514 would be stored in a second GPU texture.

The clustering module 120 is further configured to generate clusters 414 for graphic objects not subject to transformation, such as one or more of graphic objects 504, 510, and 510. In the illustrated example of display 520, the graphic objects 506, 508, 512, and 514 are subject to a translation transformation, as indicated by the arrow 522, which moves graphic objects 506, 508, 512, and 514 from a left portion of the display near graphic object 510 to a right portion of the display near graphic objects 504 and 516. Thus, in the illustrated example, although graphic objects 504, 510, and 516 are not themselves subject to the transformation indicated by arrow 522, graphic objects 504, 510, and 516 fall within a minimum frame buffer for the transformation. Thus, to reduce a number of central processing unit or GPU cycles that might otherwise be required to re-draw the actual graphic objects (e.g., the vector objects of graphic objects 504, 510, and 516), the clustering module 120 is configured to allocate each of graphic objects 504, 510, and 516 to a separate cluster 414. In this manner, representations of the graphic objects 504, 510, and 516 are stored in third, fourth, and fifth GPU textures, respectively.

The transformation module 114 then applies the transformation as indicated by the input 406 to the representations of the graphic objects 506, 508, 512, and 514 in real-time, rather than redrawing the graphic objects 506, 508, 512, and 514 themselves. Because true representations of the corresponding graphic object(s) 106 are included in the separate GPU textures, these transformations can be output at display 520 by the rendering module 122 to output a modified display 108 that includes at least one transformed graphic object 112 in real-time without reducing displayed content of the respective graphic objects undergoing transformation.

Having considered example details of techniques for generating a modified display including at least one of a merged graphic object or a transformed graphic object, consider now some example procedures to illustrate aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-5.

Figure 6:
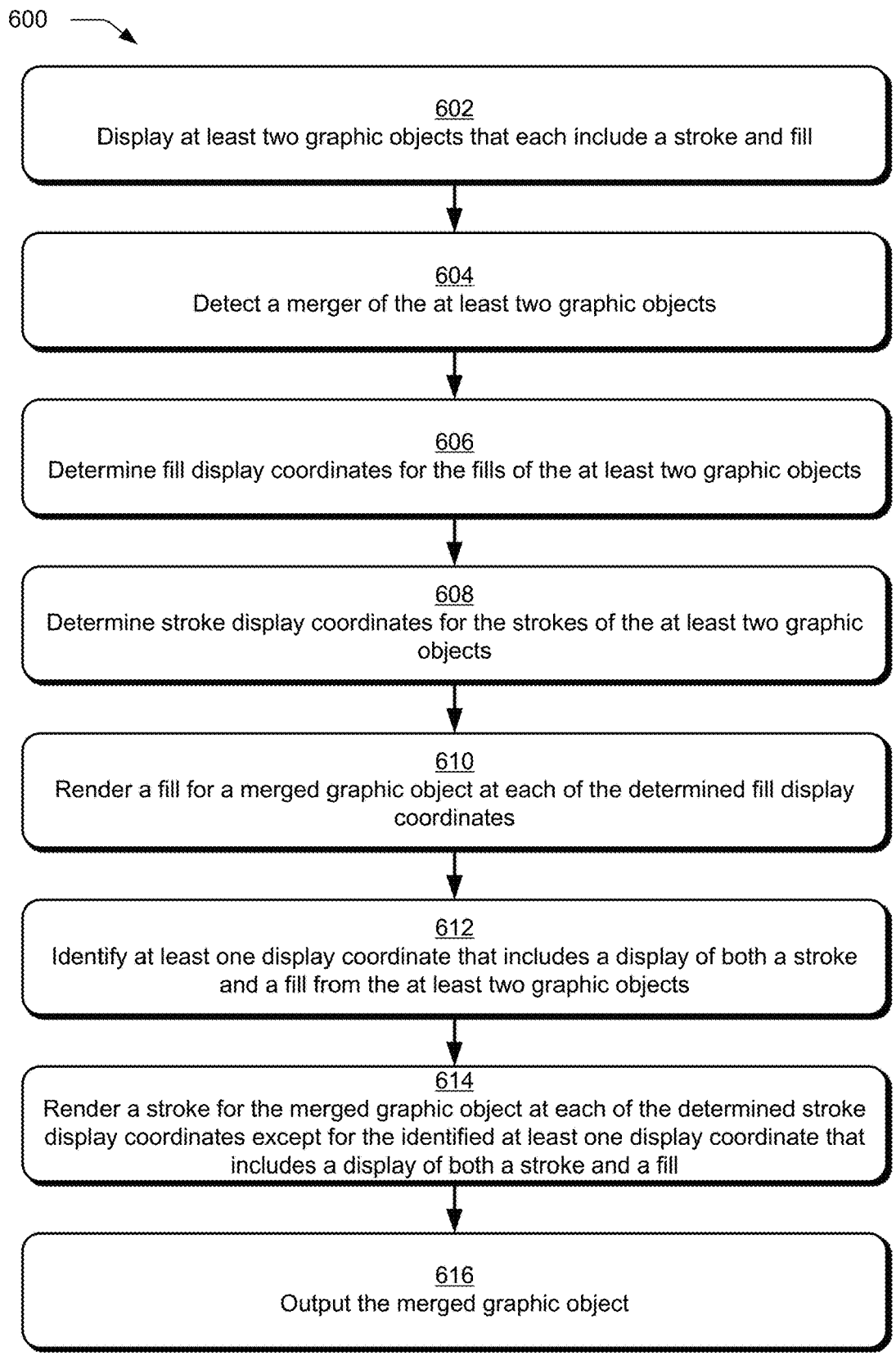
FIG. 6 is a flow diagram depicting a procedure in an example implementation for generating a merged graphic object using the techniques described herein.

FIG. 6 depicts a procedure 600 in an example implementation of generating a merged graphic object from multiple graphic objects using the techniques described herein. At least two graphic objects that each include a stroke and a fill are displayed (block 602). The computing device implementing the graphic object modification system 104, for instance, displays first graphic object 302 and second graphic object 304, which are each representative of a graphic object 106, at a display device communicatively coupled to computing device 102. In some implementations, one or more of the at least two graphic objects may include only a stroke and no fill, or only fill and no stroke. In these implementations, where a graphic object includes only a stroke and no fill, the graphic object modification system 104 generates a transparent fill for the graphic object and processes the graphic object accordingly. Alternatively, where a graphic object includes only fill and no stroke, the absence of a stroke is disregarded by the graphic object modification system and only the fill of the graphic object is processed.

A merger of the at least two graphic objects is then detected (block 604). The transformation module 114, for instance, receives input 208 indicating that the first graphic object 302 and the second graphic object 304 are to be merged into a merged graphic object. Upon detecting the merger of the at least two graphic objects, fill display coordinates for the fills of the at least two graphic objects are determined (block 606). The position determining module 116, for instance, determines fill coordinates 214 representing the fills 206 of each of the at least two graphic objects being merged, which are individually represented by graphic object 202. The fill coordinates 214 may be configured in any suitable manner, such as pixel values, Cartesian coordinates, and the like.

Stroke display coordinates for the strokes of the at least two graphic objects are also determined (block 608). The position determining module 116, for instance, determines stroke coordinates 212 representing the strokes 204 of each of the at least two graphic objects being merged, which are individually represented by the graphic object 202. The stroke coordinates 212 may be configured in any suitable manner, such as pixel values, Cartesian coordinates, and so forth.

A fill for the merged graphic object generated from the at least two graphic objects is then rendered at each of the determined fill display coordinates (block 610). The buffer module 118, for instance, creates GPU buffer 216 and writes maximum sentinel values to the buffer for each of the corresponding fill coordinates 214 of the at least two graphic objects being merged. For instance, in the illustrated example of FIG. 3, the buffer module 118 writes maximum sentinel values to the GPU buffer 216 for each of the fill coordinates 214 represented by the fills 310 and 314 of the first and second graphic objects 302 and 304, respectively. The GPU buffer 216 is then communicated to the rendering module 122, which renders a fill 220 for the merged graphic object 110 as specified by the maximum sentinel values of the GPU buffer 216. The fill 220 of the merged graphic object 110 is illustrated at 326 for the merged graphic object 306 of FIG. 3.

At least one display coordinate is identified that includes a display of both a stroke and a fill from the at least two graphic objects being merged (block 612). A stroke for the merged graphic object is then rendered at each of the determined stroke display coordinates, except for the identified at least one display coordinate that includes a display of one object's stroke and a different object's fill (block 614). The buffer module 118, for instance, writes minimum sentinel values to the GPU buffer for each of the corresponding stroke coordinates 212 of the at least two graphic objects being merged. The buffer module 118, however, prevents minimum sentinel values for a first one of the at least two graphic objects being merged from overwriting a maximum sentinel value representing a fill of a different one of the at least two graphic objects being merged. In some implementations, the buffer module 118 permits minimum sentinel values to overwrite maximum sentinel values so long as the minimum and maximum sentinel values correspond to a single one of the at least two graphic objects being merged to account for graphic objects with strokes that lie partially or completely inside the graphic object's fill. For instance, in the illustrated example of FIG. 3, the buffer module 118 writes minimum sentinel values to the GPU buffer 216 for each of the stroke coordinates 212 represented by the solid portions of the circles 318 and 322. The buffer module 118 prevents writing minimum sentinel values corresponding to the dashed portions of the circles 318 and 322, which correspond to strokes of the first and second graphic objects 302 and 304 that conflict with maximum sentinel values in the GPU buffer 216 occupied by fills of the first and second graphic objects 302 and 304. The GPU buffer 216 is then communicated to the rendering module 122, which renders a stroke 218 for the merged graphic object 110 as specified by the minimum sentinel values of the GPU buffer 216. The stroke 218 of the merged graphic object 110 is illustrated at 324 for the merged graphic object 306 in the example of FIG. 3.

The merged graphic object is then output (block 616). The graphic object modification system 104, for instance, outputs the merged graphic object 110 for display at a display device of the computing device 102, outputs the merged graphic object 110 for storage at the computing device 102, or communicates the merged graphic object 110 to a different computing device and/or a service provider 124 via network 126.

Figure 7:
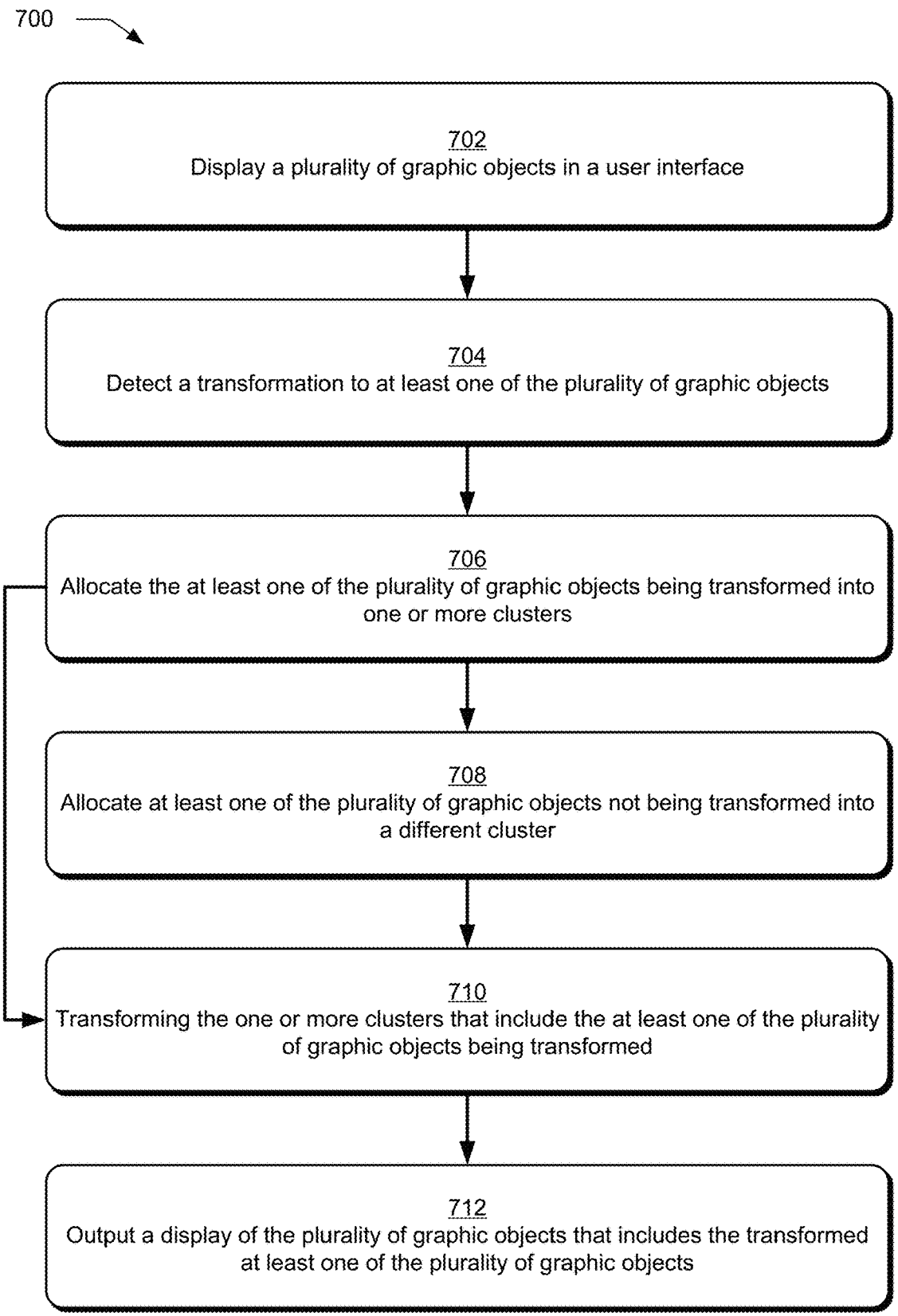
FIG. 7 is a flow diagram depicting a procedure in an example implementation for generating a transformed graphic object using the techniques described herein.

FIG. 7 depicts a procedure 700 in an example implementation of generating a modified display including at least one transformed graphic object using the techniques described herein. A plurality of graphic objects are displayed in a user interface (block 702). A computing device implementing the graphic object modification system 104, for instance, displays graphic objects 504, 506, 508, 510, 512, 514, and 516, which are each representative of a graphic object 106, in a user interface that includes display 502 at a display device communicatively coupled to computing device 102.

A transformation to at least one of the plurality of graphic objects is detected (block 704). The transformation module 114, for instance, receives input 406 selecting graphic objects 506, 508, 512, and 514 along with an indication of a transformation to be applied to the selected graphic objects (e.g., a translation). In response to determining which graphic objects are to be transformed, the position determining module 116 identifies z-order information for each of the graphic objects being transformed as well as position information describing a rendering location of the graphic objects to be transformed. The position determining module 116 compiles this information into z-order information 410 and position information 412. In addition to describing the graphic objects to be transformed, the z-order information 410 and position information 412 compiled by the position determining module 116 may additionally describe one or more other graphic objects not subject to the transformation. For instance, the position determining module 116 may additionally include information describing the graphic objects 504, 510, and 516 in the z-order information 410 and position information 412.

The at least one of the plurality of graphic objects being transformed are then allocated into one or more clusters (block 706). The clustering module 120, for instance, uses the z-order information 410 to allocate the graphic objects 506, 508, 512, and 514 into separate clusters 414. In an example implementation where graphic objects 506 and 508 have contiguous z-order positions, where graphic objects 508 and 512 do not have contiguous z-order positions, and where graphic objects 512 and 514 have contiguous z-order positions, the clustering module 120 is configured to allocate graphic objects 506 and 508 to a first cluster 414 and allocate graphic objects 512 and 514 to a second cluster 414. Each cluster 414 generated by the clustering module 120, and its included one or more graphic objects 416, are rendered by the rendering module 122 in a separate GPU texture. Alternatively, in some implementations each cluster 414 and its constituent graphic object(s) 416 are rendered in a separate GPU texture by the buffer module 118 of the graphic object modification system 104.

Optionally, at least one of the plurality of graphic object not being transformed is allocated to a different cluster (block 708). The optionality of this step is indicated by the arrow circumventing block 708. The clustering module 120, for instance, may determine a minimum frame buffer that needs to update based on the graphic object(s) selected for transformation and the corresponding transformation being applied. For example, the clustering module 120 may identify that one or more of graphic objects 506, 508, 512, or 514 undergoing transformation will visually overlap a non-transformed graphic object during the transformation, such as one or more of graphic objects 504, 510, or 516. The clustering module 120 may allocate each of graphic objects 504, 510, and 516 to their own cluster 414, such that the actual graphic objects 504, 510, and 516 do not have to be re-drawn during transformation operations performed to other graphic objects, thereby reducing a number of GPU cycles required to output such a display.

The one or more clusters that include the at least one of the plurality of graphic objects being transformed are then transformed (block 710). The transformation module 114, for instance, applies the transformation specified by input 406 to the cluster including representations of graphic objects 506 and 508 and to the cluster including representations of graphic objects 512 and 514. A display of the plurality of graphic objects that includes the transformed at least one of the plurality of graphic objects is then output (block 712). The rendering module 122, for instance, outputs displays 518 and 520 at a user interface of a display device communicatively coupled to the computing device implementing the graphic object modification system 104, updating from display 518 to display 520 in real-time as the transformation indicated by arrow 522 is performed, such as via input 406. Thus, a progression from display 518 to display 520, inclusive, is representative of a modified display 108 including at least one transformed graphic object 112. The graphic object modification system 104, for instance, outputs the modified display 108 including the transformed graphic object 112 for display at a display device of the computing device 102, outputs the modified display 108 for storage at the computing device 102, or communicates the modified display 108 to a different computing device and/or a service provider 124 via network 126.

Having described example procedures in accordance with one or more implementations, consider now an example system and device that can be utilized to implement the various techniques described herein.

Example System and Device

Figure 8:
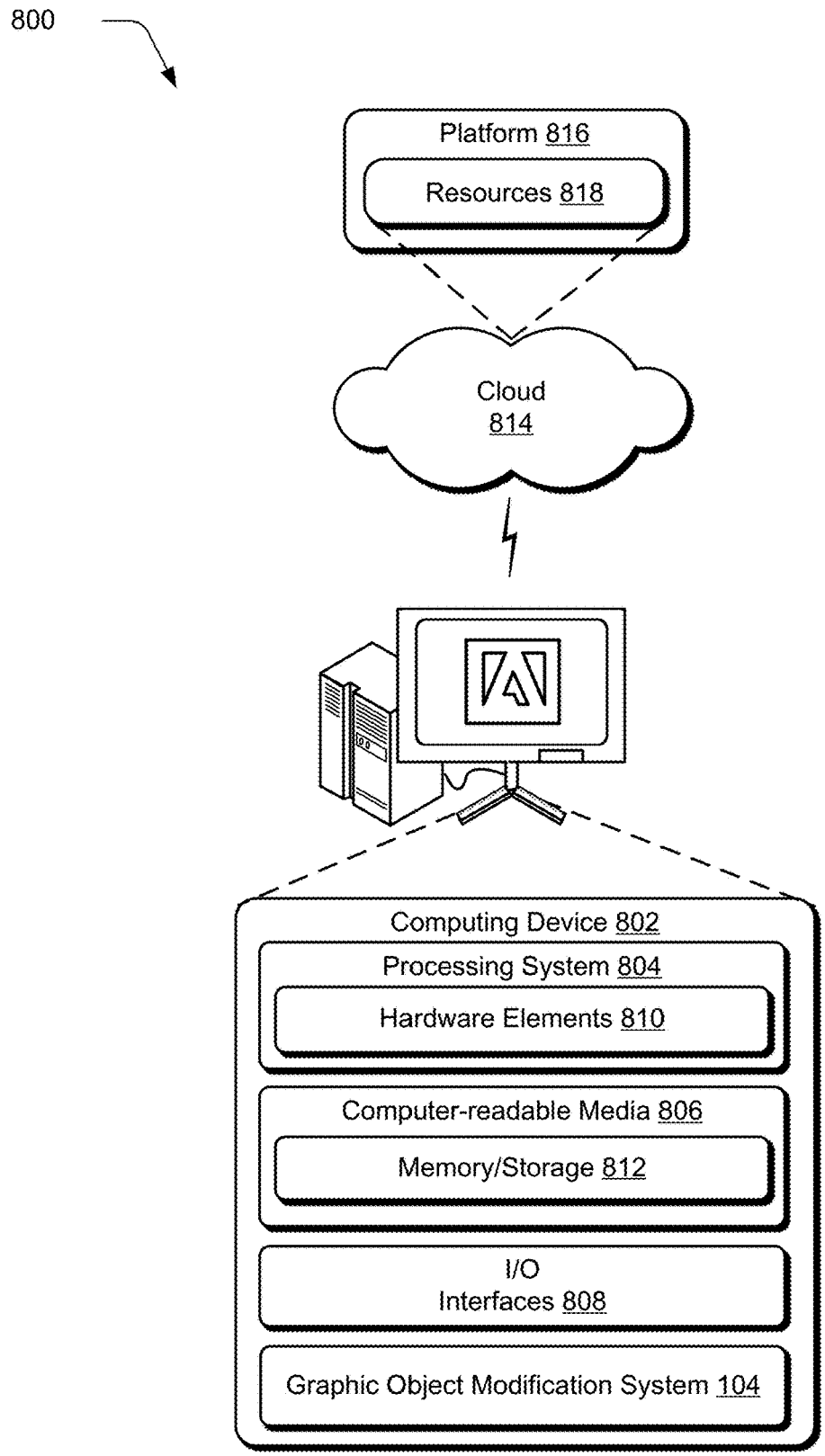
FIG. 8 illustrates an example system including various components of an example device that can be implemented as a computing device as described and/or utilized with reference to FIGS. 1-7 to implement the techniques described herein.

FIG. 8 illustrates an example system generally at 800 that includes an example computing device 802 that is representative of one or more computing systems and/or devices that may implement the various techniques described herein. This is illustrated through inclusion of the graphic object modification system 104. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interface 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware element 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources and functions to connect the computing device 802 with other computing devices. The platform 816 may also serve to abstract scaling of resources to provide a corresponding level of scale to encountered demand for the resources 818 that are implemented via the platform 816. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

Conclusion

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to control rendering of digital content, a method implemented by at least one computing device, the method comprising:

detecting, by the at least one computing device, a transformation being applied to at least two of a plurality of vector graphic objects displayed in a user interface;

allocating, by the at least one computing device, at least some of the plurality of vector graphic objects into multiple clusters by:
identifying the at least some of the plurality of vector graphic objects as being affected by the transformation;
identifying other ones of the plurality of vector graphic objects unaffected by the transformation;
allocating the at least two of the plurality of vector graphic objects to a first cluster of the multiple clusters; and
excluding the other ones of the plurality of vector graphic objects from the multiple clusters;
transforming, by the at least one computing device, the at least two of the plurality of vector graphic objects by applying the transformation to the first cluster; and
outputting, by the at least one computing device, a display of the plurality of vector graphic objects that includes the transformed at least two of the plurality of vector graphic objects.

2. The method as described in claim 1, wherein each of the plurality of vector graphic objects includes information specifying a z-order rendering position relative to others of the plurality of vector graphic objects.

3. The method as described in claim 2, wherein each of the multiple clusters comprises one or more vector graphic objects having contiguous z-order rendering positions.

4. The method as described in claim 1, wherein the transformation comprises one of a translation, a shear, a scale, or a rotation of the at least two of the plurality of vector graphic objects.

5. The method as described in claim 1, further comprising determining a minimum frame buffer required to render the transformation, wherein the at least some of the plurality of vector graphic objects are identified as being encompassed by the minimum frame buffer.

6. The method as described in claim 5, wherein the first cluster does not include vector graphic objects encompassed by the minimum frame buffer that are not subject to the transformation.

7. The method as described in claim 1, further comprising rendering, by the at least one computing device, each of the multiple clusters in a separate graphic processing unit texture.

8. The method as described in claim 7, wherein each of the multiple clusters include an alternative representation of the at least some of the plurality of vector graphic objects included in the cluster and applying the transformation to the first cluster comprises applying the transformation to the alternative representations of the at least two of the plurality of vector graphic objects.

9. The method as described in claim 7, further comprising rasterizing, by the at least one computing device, the graphic processing unit texture for the first cluster in real-time during the transforming the at least two of the plurality of vector graphic objects, wherein outputting the display of the plurality of vector graphic objects comprises rendering the plurality of vector graphic objects using their respective GPU texture representations.

10. The method as described in claim 1, wherein allocating the plurality of vector graphic objects into multiple clusters comprises allocating overlapping ones of the plurality of vector graphic objects having contiguous z-order rendering positions into one cluster and allocating objects of the plurality of vector graphic objects that do not overlap with other vector graphic objects of the plurality of vector graphic objects into separate clusters.

11. In a digital medium environment to control rendering of digital content, a system comprising:
one or more processors; and
a computer-readable storage medium having instructions stored thereon that are executable by the one or more processors to perform operations comprising:
detecting a transformation being applied to at least two of a plurality of vector graphic objects displayed in a user interface;
allocating at least some of the plurality of vector graphic objects into multiple clusters by:
identifying the at least some of the plurality of vector graphic objects as being affected by the transformation;
identifying other ones of the plurality of vector graphic objects unaffected by the transformation;
allocating the at least two of the plurality of vector graphic objects to a first cluster of the multiple clusters; and
excluding the other ones of the plurality of vector graphic objects from the multiple clusters;
transforming the at least two of the plurality of vector graphic objects by applying the transformation to the first cluster; and
outputting a display of the plurality of vector graphic objects that includes the transformed at least two of the plurality of vector graphic objects.

12. The system as described in claim 11, wherein each of the plurality of vector graphic objects includes information specifying a z-order rendering position relative to others of the plurality of vector graphic objects.

13. The system as described in claim 11, wherein each of the multiple clusters comprises one or more vector graphic objects having contiguous z-order rendering positions.

14. The system as described in claim 11, the operations further comprising rendering each of the multiple clusters in a separate graphic processing unit texture.

15. The system as described in claim 14, wherein each of the multiple clusters include an alternative representation of one or more vector graphic objects included in the cluster and applying the transformation to the first cluster comprises applying the transformation to alternative representations of the at least two of the plurality of vector graphic objects.

16. The system as described in claim 14, the operations further comprising rasterizing the graphic processing unit texture for the first cluster in real-time during the transforming the at least two of the plurality of vector graphic objects, wherein outputting the display of the plurality of vector graphic objects comprises rendering the plurality of vector graphic objects using their respective graphic processing unit texture representations.

17. The system as described in claim 11, wherein allocating the plurality of vector graphic objects into multiple clusters comprises allocating overlapping ones of the plurality of vector graphic objects having contiguous z-order rendering positions into one cluster and allocating vector graphic objects of the plurality of vector graphic objects that do not overlap with other vector graphic objects of the plurality of vector graphic objects into separate clusters.

18. In a digital medium environment to control rendering of digital content, a method implemented by at least one computing device, the method comprising:
detecting, by the at least one computing device, a transformation being applied to at least two of a plurality of vector graphic objects displayed in a user interface;
allocating, by the at least one computing device, at least some of the plurality of vector graphic objects into multiple clusters, the multiple clusters including a first cluster comprising the at least two of the plurality of vector graphic objects;

rendering, by the at least one computing device, each of the multiple clusters in a separate graphic processing unit texture;

transforming, by the at least one computing device, the at least two of the plurality of vector graphic objects by applying the transformation to the first cluster; and outputting, by the at least one computing device, a display of the plurality of vector graphic objects that includes the transformed at least two of the plurality of vector graphic objects.

19. The method as described in claim 18, wherein each of the multiple clusters include an alternative representation of one or more vector graphic objects included in the cluster and applying the transformation to the first cluster comprises applying the transformation to the alternative representations of the at least two of the plurality of vector graphic objects.

20. The method as described in claim 18, further comprising determining a minimum frame buffer required to render the transformation, wherein the at least some of the plurality of vector graphic objects are identified as being encompassed by the minimum frame buffer.

\* \* \* \* \*